Oct. 24, 1944.  A. G. B. METCALF  2,360,883
INTEGRATING METHOD AND APPARATUS
Filed Oct. 31, 1939  7 Sheets-Sheet 1
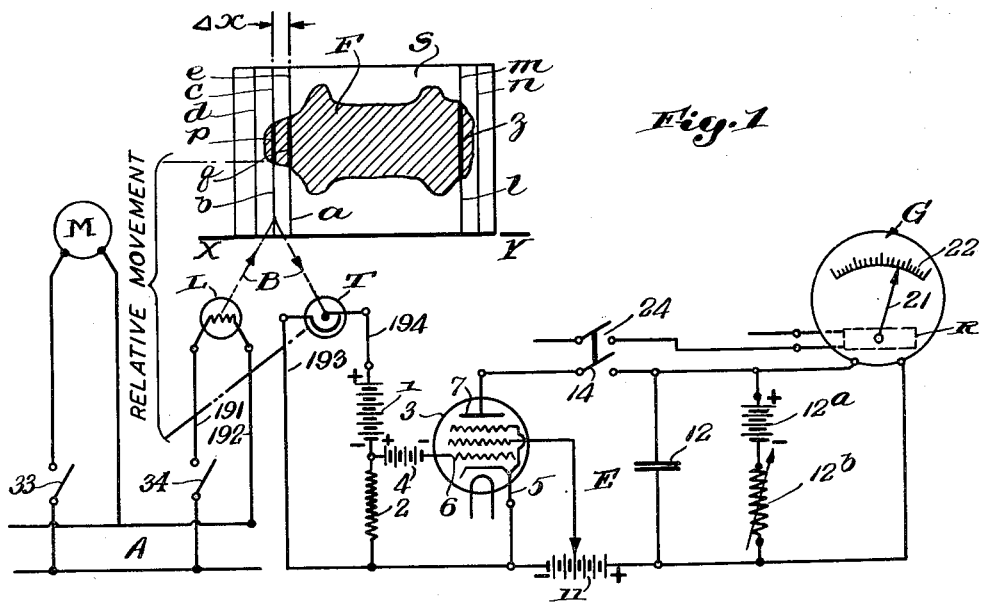
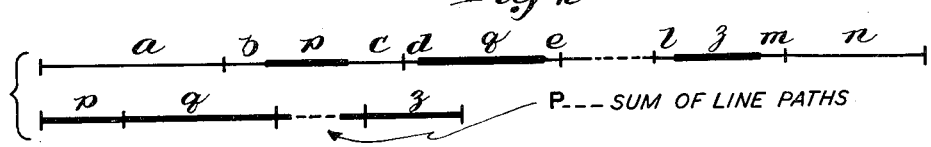
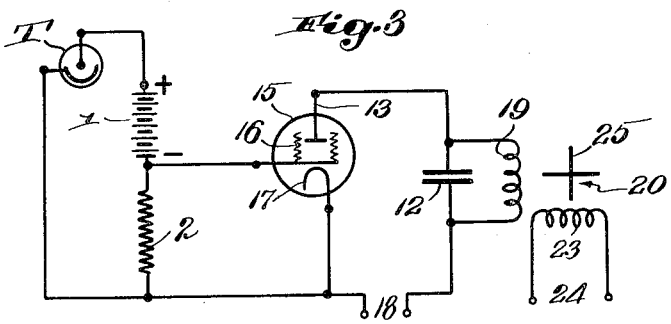
Inventor
Arthur G. B. Metcalf,
by Roberts, Cushman & Woodbury.
his Attys.

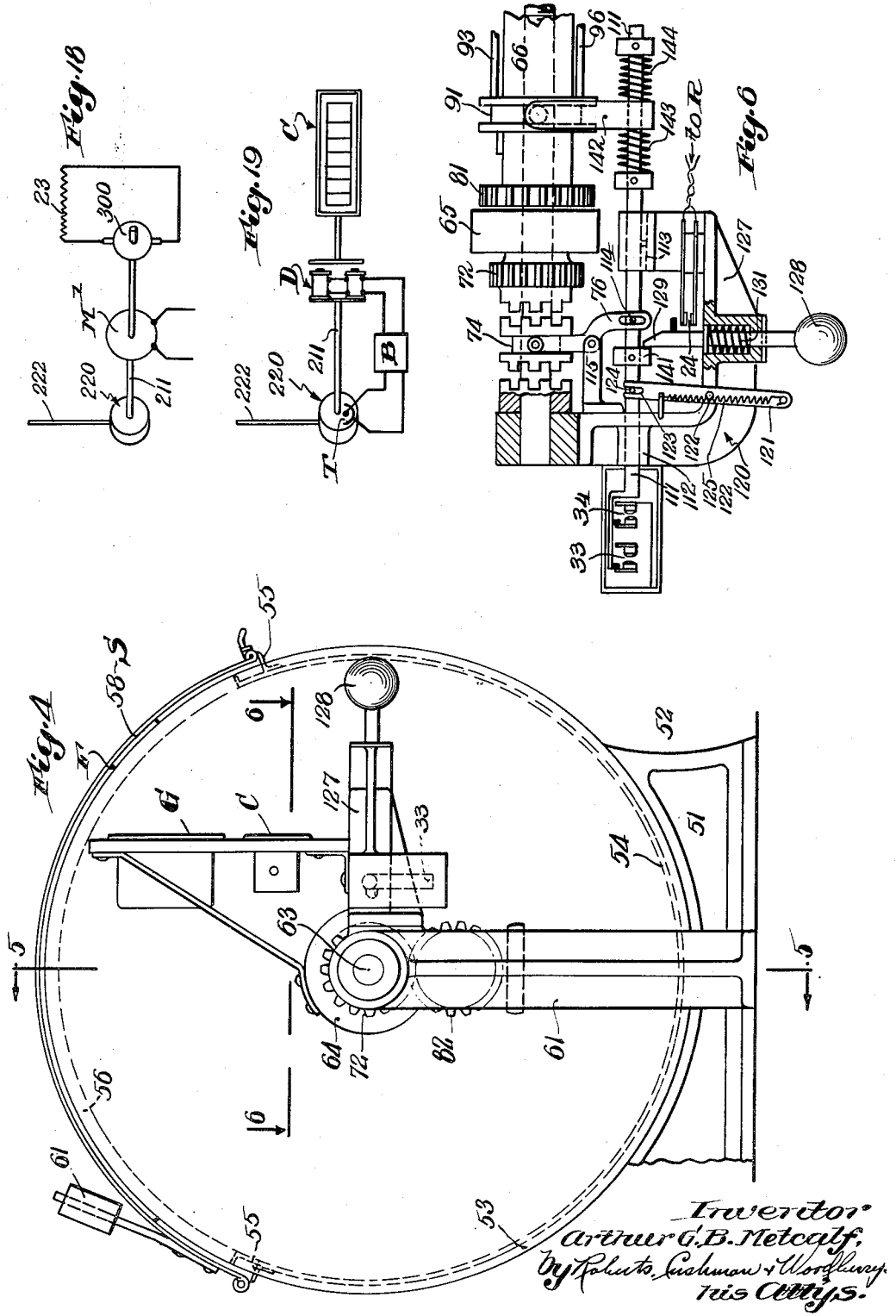

Oct. 24, 1944.  A. G. B. METCALF  2,360,883
INTEGRATING METHOD AND APPARATUS
Filed Oct. 31, 1939    7 Sheets-Sheet 3
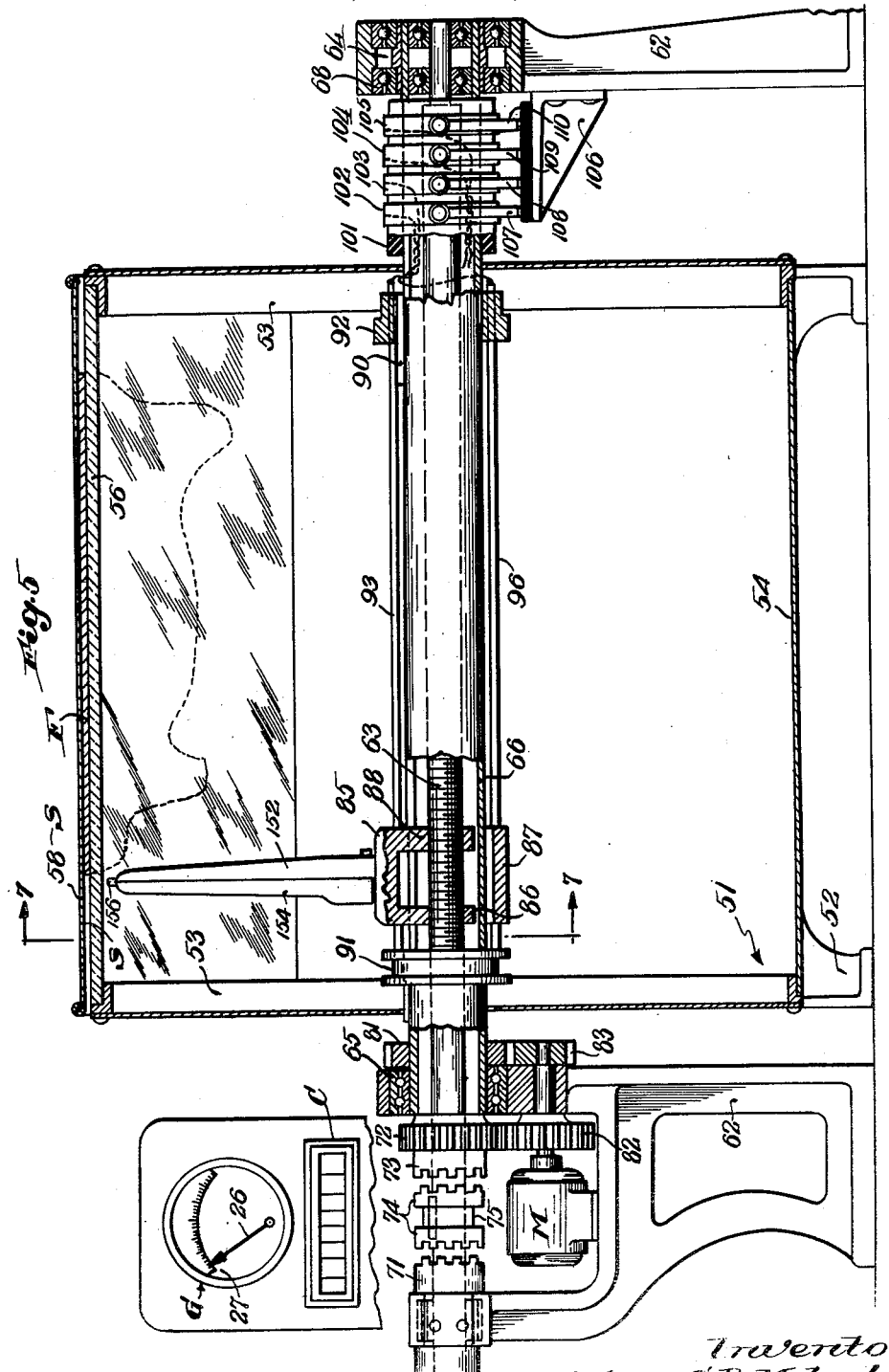

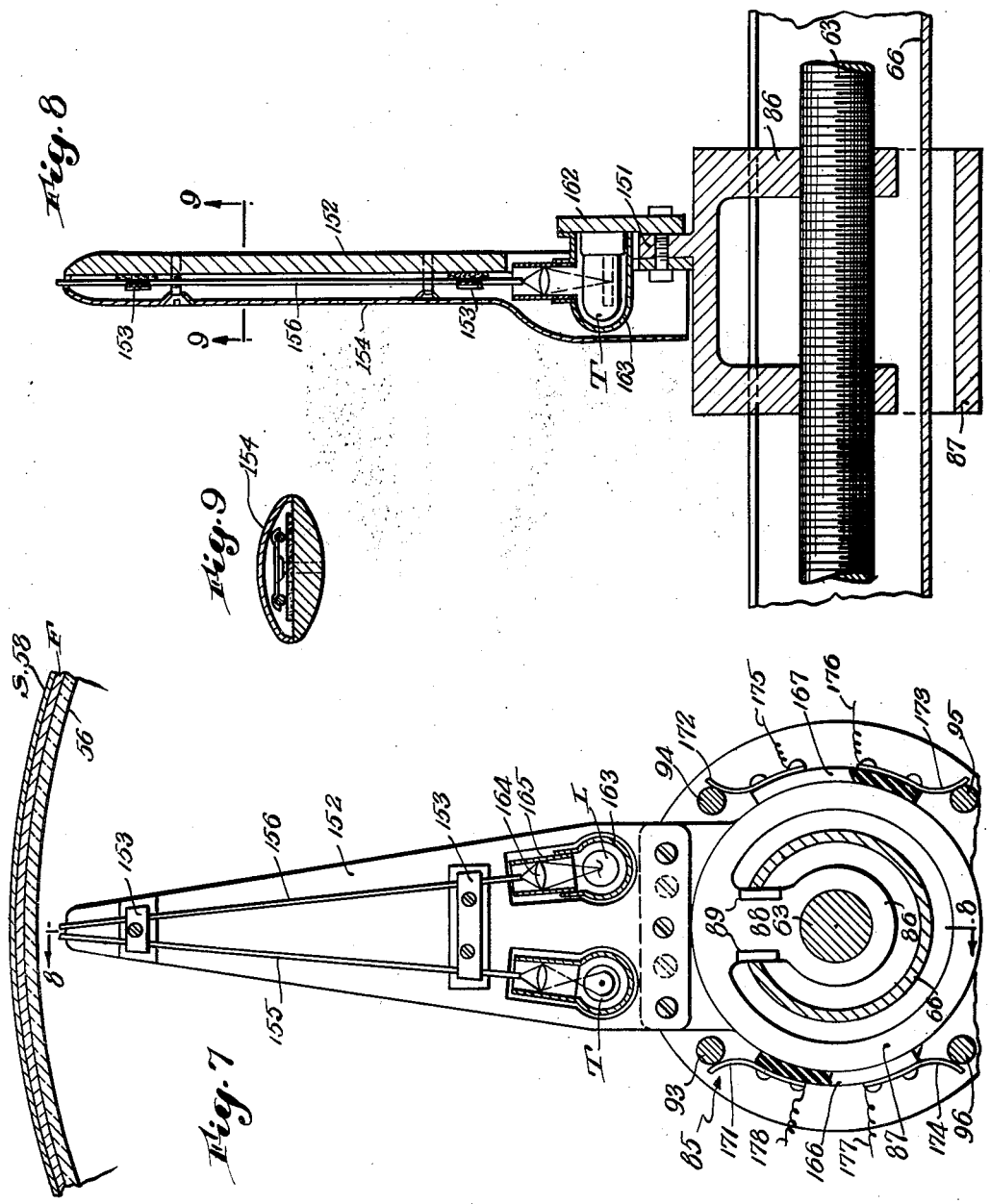

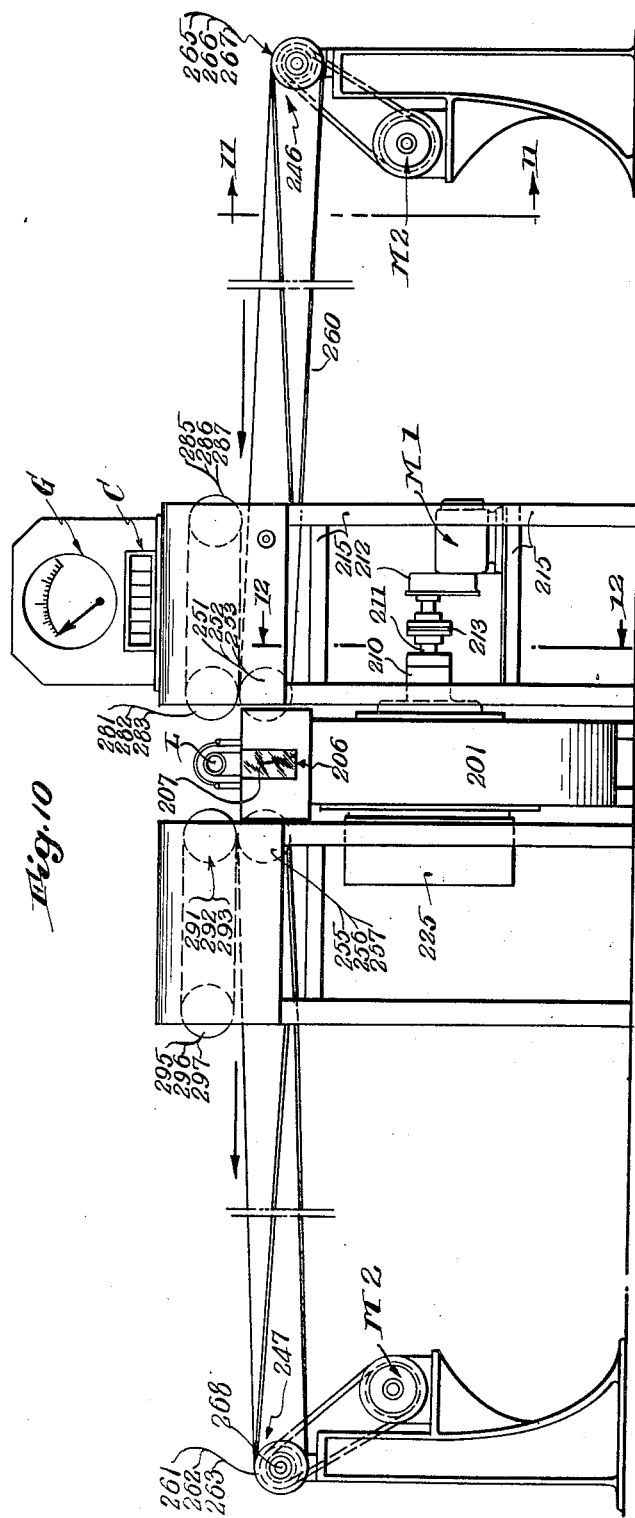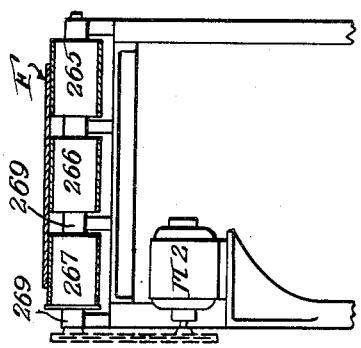

Oct. 24, 1944. A. G. B. METCALF 2,360,883
INTEGRATING METHOD AND APPARATUS
Filed Oct. 31, 1939 7 Sheets-Sheet 6
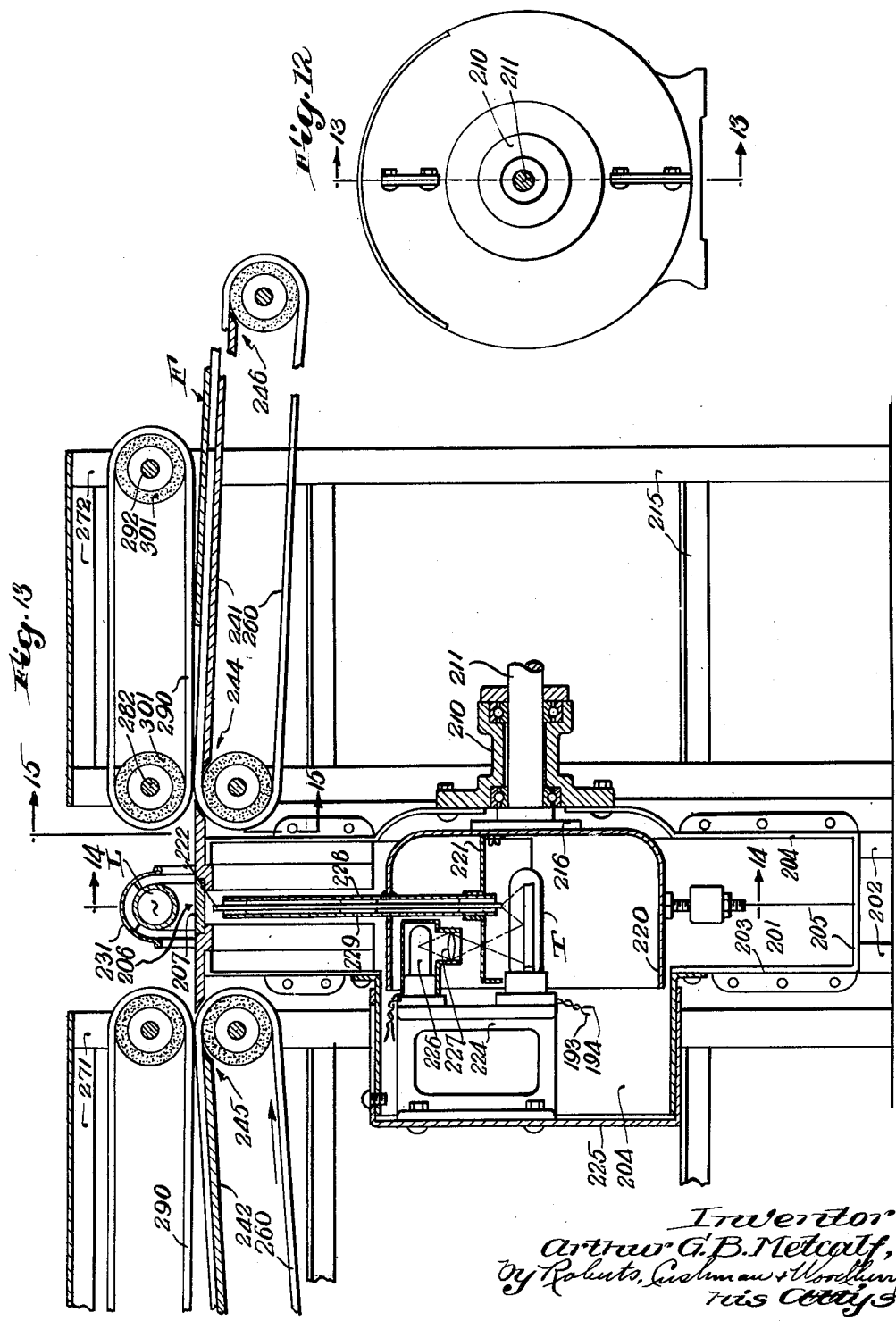

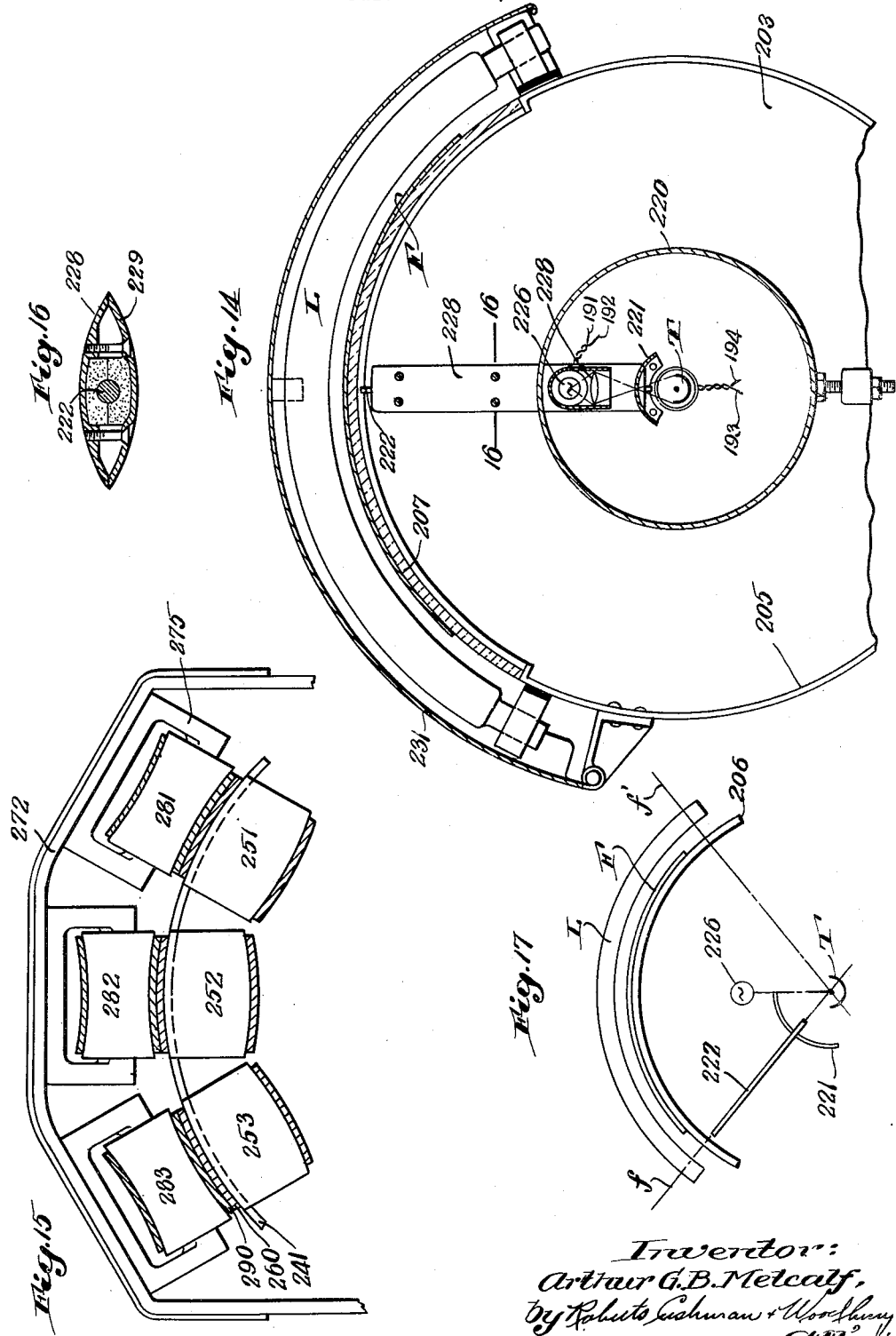

Patented Oct. 24, 1944

2,360,883

UNITED STATES PATENT OFFICE 2,360,883

INTEGRATING METHOD AND APPARATUS

Arthur G. B. Metcalf, Milton, Mass., assignor to North American Research Corporation, Cambridge, Mass., a corporation of Massachusetts Application October 31, 1939, Serial No. 302,185

6 Claims. (Cl. 33—123)

The present invention relates to the integration of functions, as for example the measuring of areas, by affecting a control or a reading proportionate to a dimension or the sum of dimensions of a surface.

It has heretofore been proposed to measure the area of a surface by measuring the average illumination of a known area, with the unknown area, of different light affecting properties, superimposed thereon. It has also been proposed to subdivide an area into component portions, as strips, of known areas including unknown areas, the average reflection or transmission values of the component portions being measured in terms of average light intensity whereupon the average intensity values for the respective portions are summated to obtain the total area to be found.

Integration of this type depends in principle upon the degree of constancy of the properties of light sources, photoelectric cells, light transmitting media and all electric circuit components used in carrying out the measurement. However, all extant devices of this type are not constant in this respect and vary considerably with time or other factors. Since the areas ultimately indicated are inseparably correlated to these normal variations, it is impossible to determine what part of a total integration corresponds correctly to the area to be measured and what part is due to fluctuation of the electric or illumination values. Therefore, the area indicated may or may not conform to the actual value to be measured.

It is the principal object of the present invention to measure areas or to integrate functions generally by summating values proportionate to a path or paths traversing an article defining a function. This object is preferably attained with the aid of photoelectric means, in a manner inherently independent of variations of the light affecting properties of surfaces defining the area to be measured, of intensity variations of light sources and sensitivity changes of photo tubes, and free from the effects of changes in electrical devices due to age, fluctuations in supply voltage and other factors. Further objects are to affect a control or a meter proportionate to the integral of a dimension of a traversed path; to divorce the integrating operation completely from any influence of more or less indefinite and uncontrollable variations of summated light or other intensities, but instead to operate with two extreme intensities whose incidental variations are immaterial; to provide an integrator, as for example a hide measuring machine which works exactly and rapidly, without inherent mechanical, optical or electrical sources of errors; whose integrating operation is performed entirely by a simple electrical circuit, which is adaptable to industrial operating conditions, whose accuracy can be increased by simple expedients to any desired practical degree and which indicates a measured area exactly, without time delay and independently of gradual wear, and speed of operation.

In one of its aspects, the invention proposes to integrate a function by summating paths or trace summands of varying values, corresponding to the periods during which a scanning element passes a surface element effecting a contrasting light intensity change which itself may vary over a considerable range without introducing errors into the integrating operation. In another aspect, the invention utilizes the trigger action of certain electrical apparatus for initiating the recordation of electric impulses of constant amplitude, during periods when a scanning element detects a change of condition whose value is anywhere beyond a predetermined value, so that incidental variations of that condition are immaterial. Further, the invention may employ as a particularly practical feature scanning devices with light conductors, arrangements for quickly, reliably and conveniently controlling the movement and illumination of measuring elements as well as the feeding of material to be measured, and electrical circuits especially suited for summating electrical impulse increments.

These and other objects, aspects and features of the invention will be apparent from the following description of various embodiments explaining its genus by way of example and referring to the drawings, in which:

Fig. 1 is a diagram of the integration according to the invention, and of apparatus suitable for carrying it out;

Fig. 2 is a diagram illustrating the integrating operation according to the invention;

Fig. 3 is the diagram of a modification of the circuit according to Fig. 1;

Fig. 4 is a side elevation of a practical embodiment of the invention;

Fig. 5 is a section on lines 5—5 of Fig. 4;

Fig. 6 is a top view, with parts in horizontal section, seen in direction 6 indicated in Fig. 4;

Fig. 7 is a section on lines 7—7 of Fig. 5;

Fig. 8 is a section on lines 8—8 of Fig. 7;

Fig. 9 is a section on lines 9—9 of Fig. 8;

Fig. 10 is a front elevation of another practical embodiment of the invention, incorporating an object conveyor;

Fig. 11 is a section on lines 11—11 of Fig. 10;
Fig. 12 is a section on lines 12—12 of Fig. 10;
Fig. 13 is a section on lines 13—13 of Fig. 12;
Fig. 14 is a section on lines 14—14 of Fig. 13;
Fig. 15 is a section on lines 15—15 of Fig. 13;
Fig. 16 is a section on lines 16—16 of Fig. 14;
Fig. 17 is a diagram illustrating the operation of scanning equipment according to Fig. 14;
Fig. 18 is a diagram illustrating speed compensation equipment for a device according to the invention; and
Fig. 19 is a diagram illustrating an electromechanical summating device according to the invention.

With reference to Figs. 1 and 2, integration according to the invention will first be described without regard to specific mechanism for carrying it out. In Fig. 1 an irregular surface F may represent a function to be integrated, for example a hide whose area is to be measured. This area to be measured is in fixed relation applied to a standard area S, areas F and S having different light affecting properties, respectively; for example, F may be opaque and S transparent, or they may reflect at different rates, light incident thereon.

A light source L directs, by suitable means, a light beam B towards areas F, S, which transmit, or reflect it towards photoelectric tube T.

A motor M of constant speed, or with known speed characteristic, for example supplied with current from line A, provides relative movement between surface S and beam B in such a manner that the beam traces a number of line paths across areas F, S, defining the areas by way of these traces, as for example $a; b, p, c; d, q, e; \ldots l, z, m; n$; indicated in Fig. 1.

Photo tube T controls an electric integrating circuit E for example of the following type. Across the terminals of photoelectric tube T are connected in series a direct current source 1, for example a battery supplying 90 volt, and a resistance 2 of about 10 megohm. An electron discharge tube 3, preferably of the type having a plate current which is practically constant for widely varying plate voltages (for example, R. C. A.—58) has a cathode 5 connected to the photo tube cathode and one terminal of resistance 2, and a control grid 6 connected to a point between resistor 2 and the positive terminal of battery 1, through biasing battery 4 of about —20 volt. The output circuit includes an anode battery 11 of about 500 volt, a condenser 12 of about 40 mf., a balancing circuit with battery 12ª of about 10 volt and a resistance 12ᵇ of about 10,000 ohm for compensating normal current flow and condenser leakage, and a switch 14 between condenser 12 and plate 7 of tube 3. A metering device G is connected across condenser 12, which device may consist of an electrostatic voltmeter of conventional design, with an indicator 21 playing over a suitably calibrated scale 22. A resetting device indicated at R is preferably provided permitting movement of hand 21 in one direction, but returning it into initial position upon energization of the resetting element by means of switch 24. Switches 33 and 34 may be provided for motor and lamp circuits respectively; resetting switch 24 and plate circuit switch 14 may be interconnected as indicated in Fig. 1.

With a device of this general type, integration according to the invention is carried out as follows:

Assuming for example that S with area F superimposed thereon is the surface of a cylinder, slit along generatrix X—Y of Fig. 1 and developed, assuming that the light ray B is directed to trace a helical line path $a$—$b$—$p$—$c$— ... —$n$ over areas S and F, and further assuming that beam B is reflected from S (that is, on trace components $a, b, c, \ldots l, m, n$) at a greater rate than from F (on components $p, q, \ldots z$), the photo tube T will consecutively receive light of intensities varied as indicated in Fig. 2, where the paths $a, b, \ldots n$ of Fig. 1 are indicated in thin lines and, in thicker lines, paths $p, q \ldots z$ over which the photocell will receive less intense light as compared to the intensity of the beam when its line trace traverses area S.

During periods when light of comparatively high intensity strikes photo tube T, its cathode emits and current will flow in circuit 1—2—T—1. The potential drop across resistor 2 will be about 30 volts or more, of the polarity indicated in Fig. 1. This drop added to the biasing potential of battery 4 brings the control electrode potential to about —50 volts or more, referred to the cathode. Because of this blocking potential, the tube does not conduct. Variations of the control voltage within a wide range, for example from —40 to —70 volts are immaterial, potentials within that range being sufficient to bias the tube beyond the cut off point. Hence, the output circuit will be deenergized and metering device G at a standstill.

As soon as the illumination of photo tube T is decreased below a certain value, its impedance increases correspondingly and practically no current flows through resistor 2, so that the biasing potential of —20 volt prevails at grid 13. At this control potential, tube 3 will begin to become effective in passing a current of about 1 milliampere into its output circuit, independently of the plate voltage. This current charges condenser 12 and meter G, so long as the light intensity received by the photo tube is below a predetermined value, that is, so long as beam B traverses area F in paths $p, q, \ldots z$. Condenser 12 is provided as an energy reservoir because of the inertia of the electrostatic voltmeter. It should be kept in mind that, so long as photo tube T conditions grid 6 to permit electron flow in tube 3, condenser 12 and voltmeter G are supplied with a charge which is a linear function of time, although the plate voltage is constantly decreasing. This is due to the above-mentioned fact that the plate current of tubes of this type is independent of plate voltage over a wide range.

Instead of using an electrostatic voltmeter as indicating instrument, other summating apparatus may be employed for that purpose, as for example a watt hour meter. Also, integrating circuits of a different type may be employed; by way of example, a circuit incorporating a hot cathode vapor filled discharge device with control electrode, driving a watt hour meter will now be described with reference to Fig. 3.

In Fig. 3, T is again the photo tube, 1 is a current source applying appropriate potential to the photo tube electrodes, and 2 is a resistor. 15 is a thyratron for example of type G. E.-F-G 17, whose control grid 16 is connected between source 1 and resistor 2. The anode circuit of the thyratron includes cathode 17, an alternating or interrupted direct current source 18, condenser 12 and plate 13. The current element 19 of a watt hour meter 20 is connected across condenser 12, and the voltage element 23 of the meter is supplied with substantially constant potential from source 24. The meter movement 25 actuates an indicator as shown at G of Fig. 1. An arrangement of this type operates as follows.

When photo tube T is illuminated, current flows in resistor 2 in the direction indicated. The potential drop through 2 brings the control grid potential below the cut off value which, for the above tube, is about −1 volt for an anode potential of about 100 volt. Hence, no current can flow through anode circuit and watt hour meter.

With photo tube T dark, resistor 2 is without current and the control grid potential is substantially zero. The thyratron, therefore, begins to conduct, the anode current being determined by the impedance of the current element of the watt hour meter. This impedance must be chosen not to exceed the maximum current rating of the thyratron and hence an otherwise suitable standard meter might have to be provided with a special current winding.

When the photo tube receives again light flux sufficient to render its circuit conductive, grid 16 becomes again negative and resumes control as soon as the anode current is interrupted, for example at the beginning of the next negative half wave of the alternating current supplied at 24.

It will be evident that the integrating circuit may be provided with suitable amplification devices, if it should be desirable to have more energy available for actuating the indicating device G.

Since it was assumed (referring to Figs. 1 and 2) that the intensity of beam B is decreased while passing area F, and since circuit E can be set in such a manner that grid 6 blocks electron flow as soon as beam B passes from area F to area S and initiates electron flow upon the beam passing from area S to F, the indicator of voltmeter G will move certain distances proportionate to paths $p, q, \ldots z$ across area F, and the reading at scale 22 will be linearly related to the sum of these paths covering area F, as indicated in Fig. 2. Since the distance $(\Delta x)$ of linear paths $p, q, \ldots z$ can be exactly fixed, and since, obviously, an elementary area $$(\Delta A) = y\,(\Delta x)$$

if $y$ is the length of a linear path element, the entire area to be measured will be $P\,(\Delta x)$ if $P$ is the sum of all path elements within that area. The reading of meter G is proportionate to this value $P$ and hence to the area to be measured, the various constants introduced during the translation of the scanning paths into the meter reading being of course taken care of by appropriately calibrating the meter.

It will be evident that $(\Delta x)$, conforming to the distance of the scanning paths, will preferably be constant, but it is understood that it may be desirable to make $(\Delta x)$ the function of a variable, for example the scanning path. In that case also, the meter can be calibrated, or other means provided to furnish readings correctly indicating the measured area. By suitably selecting the value of $(\Delta x)$, any degree of integration accuracy can be obtained.

It will also be evident that the relative motion between beam B and surface S is preferably at constant speed, in order to obtain a linear meter scale; however, if for some reason the speed of motor M varies according to a known function, the integrations will remain correct if the meter scale is correspondingly calibrated, or the meter speed is compensated in accordance with the motor speed function. A way of providing inherent compensation for such speed variation will be described with reference to a specific embodiment of the integrating circuit.

It will be further evident that the relative motion between the area to be measured and the light beam is not necessarily helical as above described; it may for example be spiral, or reciprocating. Also, either surfaces or beam may be stationary and beam or surfaces, respectively, movable relatively thereto, or both surfaces and beam may move in the apparatus in different kinematic components, as will be described with reference to one specific embodiment of the invention.

Referring to Figs. 4 to 9, a practical embodiment of the invention will now be described. In these figures, 51 is a frame made for example from rolled steel profiles and sheets suitably welded together, and having legs 52 and two circular end pieces 53. The lower half of the cylinder formed by the two end pieces 53 is covered with reflecting material, for example a polished metal sheet 54. Fastened to two longitudinal beams 55 is a semi-cylindrical cover sheet 56 of transparent material, for example plate glass. Hinged to one of the above-mentioned longitudinal beams 55 is a semi-cylindrical cover 58 corresponding to surface S of Fig. 1, made of polished metal similar to semi-cylindrical sheet 54. A counterweight 61 (Fig. 4) may be provided in order to retain cover 58 in closed position firmly pressing skin, hide or other area to be measured into contact with fixed transparent sheet 56.

On either side of the frame 51 are arranged bearing stands 61 and 62. As shown in Figs. 5 and 6, bearing stand 62 supports a double bearing 64 for a lead screw 63 and a quill or tube 66 surrounding spindle 63, which latter extends through a bearing 65 for tube 66, on stand 61, to its bearing 66, likewise on stand 61. Tube 66 ends at bearing 65. It will be evident that this arrangement permits rotation of lead screw or spindle 63 and quill 66 either separately or simultaneously. Fixed to stand 61 at bearing 66 is one half 71 of a clutch or other suitable coupling. Idling on lead screw 63 adjacent to bearing 65 is a gear wheel 72 to which is fixed one half 73 of a second coupling. Between coupling halves 71 and 73 is arranged a double coupling element 74 keyed to screw 63 and free to move longitudinally, engaging either coupling half 71 or 73 or being in neutral position therebetween. Coupling element 74 has a groove 75 engaging a fork 76 (Fig. 6). Fastened to quill 66 on the other side of bearing 65 is a gear wheel 81. An electromotor M, preferably a synchronous motor, drives a double gear wheel 82, 83, engaging gear wheels 72 and 81, respectively, the gear ratio being selected to drive screw 63 about twice as fast as tube 66.

Lead screw 63 and tube 66 are surrounded by a threaded hub 85 which has an inner nut portion 86 and an outer guide portion 87 (see also Figs. 7 and 8). These two portions are connected by a bridge 88 (Fig. 7), extending through a slot of quill or tube 66, which bridge may be lined as indicated at 89 of Fig. 7. Slidingly keyed to either end of tube 66 are two sleeves 91 (which is grooved) and 92, respectively, which are connected by four rods 93, 94, 95 and 96. The rods pass through four correspondingly arranged holes of hub 85, so that the hub can freely slide along tube 66 and rods 93—96, but is forced to rotate with tube and rods, the latter having through sleeves 91 and 92, a limited sliding movement relatively to tube 66.

Between sleeve 92 and bearing 64, tube 66 carries fixed thereto a bushing 101 of insulating material, to which are attached four slip rings 102, 103, 104 and 105. A bracket 106 fastened to bearing stand 62 carries four brush holders 107 to 110. It will be noted that gear 81 on the one and sleeve 101 on the other side limit the sliding movement of rod sleeves 91 and 92, relatively to tube 66.

Referring now more particularly to Fig. 6—111 is a rod slidingly supported in frame portions 112 and 113 of bearing stand 61 and prevented from rotating by slot and key in frame portion 113. Linked to rod 111 at 114 is the previously mentioned fork 76 engaging clutch sleeve groove 75 and pivoted at 115. A toggle device 120 tends to maintain rod 111 in either of the two extreme positions. This device consists of a toggle lever 121 pivoted at 122, having a fork 123 engaging pin 124 of rod 111, and being loaded by toggle spring 125. Frame portion 1⁻⁻ supports a hand knob 128 with latch 129. A spring 131 tends to move latch 129 inwardly. A stop collar 141 limits the movement of rod 111 under the influence of toggle device 120, towards the right-hand side, when contacting with latch 129. By pulling hand knob 128 outwardly, rod 111 is released for further movement towards the right-hand side. Grooved sleeve 91, as above described sliding on quill 66, engages a fork 142 fastened to rod 111 by means of two cushioning springs 143 and 144.

Switches 33 and 34 (Fig. 6, compare Fig. 1) are arranged adjacent to one end of rod 111. They are kept open when rod 111 is in its left-hand position but close when the rod moves towards the right-hand side, after hand knob 128 has been pulled outwardly. A switch 24 (compare Fig. 1) is closed when handle 128 is operated.

Referring more particularly to Figs. 7 and 8, the scanning unit will now be described in detail. The above described hub 86, 87 has a flange 151 to which is fastened a leaf 152 of light metal, for example aluminum, to which are fastened with clips 153 two polished light conducting rods 155, 156, of suitable material, as for example quartz, whose function is described in detail in copending application Serial No. 284,305, filed July 13, 1939. As indicated in Figs. 8 and 9, leaf 152 is provided with a cover 154, leaf and cover providing a stiff streamlined section for the scanning arm. These light conducting rods are both directed towards a point of the inner, reflecting surface of sheet or cover 58. Rod 156 receives light from a lamp L mounted on panel 162 also fastened to flange 151. A hood 163 surrounds lamp L extending through an opening of arm 152, and the light emitted from this lamp is collected by a lens 164 and directed into the receiving surface of rod 156. Lens 164 is mounted in tube 165 which also forms a light seal around rod 156. The light flux emerging from the other end of tube 156 is reflected into the receiving surface of rod 155 and by the latter conducted towards photo tube T equipped with optical and hood devices similar to those described with reference to lamp L.

Fast to outer hub portion 87, and separated therefrom by insulating sheets 166 and 167 are four brushes 171 to 174, which slide on rods 93, 94, 95 and 96. One pair of the brushes is connected to lamp L through leads 175, 176, whereas photo tube T is connected to the other pair of brushes through leads 177 and 178. Brushes 107, 108, 109 and 110 shown in Fig. 5 are connected to the corresponding lead wires shown in Fig. 1, namely conductors 191, 192 supplying current to lamp L, and conductors 193, 194 connecting photo tube T to integrating circuit E. As mentioned above, motor M should preferably run at substantially constant speed, which is rather convenient in an arrangement of this type.

Figs. 4 and 5 also show indicating instrument G and a counter C which may be provided for recording the number of measuring operations, or the total area of a number of consecutively measured articles. The elements of the integrating circuit E (Fig. 1) may conveniently be mounted in back of indicator G.

The above described integrating apparatus operates as follows.

In order to measure for example a hide, the leather F is inserted between glass plate 56 and hinged cover 58, counterweight 61 pressing the hide flat or smooth between the two plates. At this stage of the operation, rod 111 is in the position shown in Fig. 6, namely with stop 141 resting against the latch 129 of hand knob 128. In this position spring 125 of toggle device 120 presses rod 111 towards the right-hand side and clutch half 74 is in intermediate position, close to fixed clutch half 71. Hub 85 is in its right-hand position in contact with sleeve 92.

Assuming that motor M runs counterclockwise if viewed from the gear side, tube 66 and lead screw 63 will run clockwise; since the lead screw is in this position not restrained either by clutch 71—74 or gear 72, clockwise rotation of tube 66 and the lead screw friction with respect to the nut portion 88 will retain the scanning unit in its right-hand position.

The operator now pulls knob 128 permitting toggle spring 125 to push rod 111 further towards the right, engaging coupling halves 71 and 74 and closing switches 33 and 34. The lead screw is now fixed in space and slotted tube 66, rotating clockwise will therefore carry nut 86 and the scanning unit towards the left, at the same time rotating them at uniform speed. Lamp L being supplied with current through switch 34, and the integrating circuit completed at 14, the integration proceeds as described above with reference to Fig. 1. It will be understood that reflecting sheets 54 and 58 together constitute surface S reflecting the light which emerges from conductor 156, back into conductor 155 and photo tube T. The rate of reflection being decreased when the scanning beam moves over the hide, condenser 12 will be charged at a uniform rate and the metering device will summate the lengths of the path across the hide scanned as above described, while indicator 26 moves over scale 27. It will be evident that speed and exactness of the integration can be varied by suitably selecting the pitch of the lead screw 63 (corresponding to $\Delta x$), its speed of rotation, and the diameters of the light transmission rods. As previously mentioned, lamp L is supplied with current over brushes 171, 174 and 107, 108, whereas photo tube T is connected to its circuit through brushes 172 and 174 moving on rods 94 and 95, and brushes 109, 110 sliding on rings 104 and 105.

When the scanning unit reaches sleeve 91, the latter is urged towards the left, carrying rod 111 along in the same direction, and toggle device 120 more rapidly continues this movement until clutch element 74 is engaged with clutch half 73 on gear wheel 72 which latter idles on spindle 63. Clutch element 74 being splined to spindle 63, the latter will now rotate in the same direction as quill 66 but at higher speed, which relative movement propels the scanning element towards the right. As soon as hub 85 contacts sleeve 92, the countersleeve 91 is also moved towards the right and with it rod 111 assisted by toggle 120, until stop 141 strikes latch 129 which was returned into locking position upon knob 128 being released. The clutch element 74 is again in neutral, and switches 33 and 34 open as above described; a new cycle can be initiated by again pulling handle 128. In order to reset indicator 26, switch 24 can be closed by hand, or it may for example be operated by latch 129, closing it a little prior to the release of stop 141.

Another embodiment of the invention will now be described with reference to Figs. 10 to 17. In this embodiment, both scanning element and surface to be measured are moving.

In Figs. 10, 13 and 14, 201 is a scanner housing supported on legs 202 and having circular, vertically split end walls 203, 204 and curved side walls 205. The latter have a narrow window 206 covered with a suitable curved transparent plate 207. A bearing 210 attached to one end wall of housing 201 supports shaft 211 driven through gear box 212 and coupling 213 from synchronous motor M1 mounted on table frame 215 (Fig. 10).

Attached to flange 216 of shaft 211 is scanner head 220 with baffle 221. Mounted in head 220 and baffle 221 is a scanning rod 222, a light conducting rod of the above-described type and preferably of very small diameter, reaching from window plate 207 to photo tube T mounted on a bracket 224 on a tubular slide cover 225, of housing 201. A shielded lamp 226 with lens system 227 is likewise mounted within housing 201, extending into the space between the wall of scanner head 220 and baffle 221. The scanner rod 222 may be mounted between two sheath halves 228, 229 forming a rigid low air resistance housing, as indicated in Fig. 16.

A curved light source, for example tubular incandescent lamp L, is mounted in housing 231 opposite window 206, covering the maximum arc filled by surface F to be measured. As indicated in Fig. 17, baffle 221 covers an arc which is only long enough to permit exposure of photo tube T to lamp 226 during the passing of scanning rod 222 from a line $f$ between the outermost edge of an area F and the effective end of lamp L to the passing of a corresponding line $f^1$ on the opposite side of the scanning window, assuming that window 206 extends beyond the lamp ends. In this manner, the illuminated surface S (compare Fig. 1) is effectively extended around the entire scanner housing. The overlap in illumination of the photo tube by rod 222 and auxiliary light source 226, respectively, provides for continuous scanning of area S with the higher light intensity, appropriate with this embodiment of the invention. The lens system 227 focuses a beam of light at the circumference of baffle 221 as indicated in Fig. 14, so that control of the photo tube is transferred from the scanning rod to the auxiliary light source at a definite line, and any possibility is avoided of light from the auxiliary source falling on the photo tube during the scanning operation as the rod passes by the skin when lamp L is obscured by opaque surface F. Lamp 226 and lens system 227 are preferably so designed that the light flux which they direct to the cathode of the photo tube has about the same value as that due to the flux coming from lamp L through light conductor 222.

In order to move articles whose areas are to be measured, for example hides, over scanning window 206, conveyor tables 241, 242 (Figs. 10, 11, 13, 15) are provided on either side of scanner housing 201. The inner edges 244, 245 of these tables follow the curvature of housing 201, whereas the outer edges 243, 247 are straight. Below these edges are mounted three conveyor rolls for each edge, the inner rolls 251, 252, 253 and 255, 256, 257 being crowned to follow the contour of the scanner housing, and the outer rolls 261, 262, 263 and 265, 266, 267 being straight. Belts 260 are stretched over respective pairs of rolls, as indicated in Figs. 10 and 13. The outer rolls 261—263 and 265—267 are driven synchronously with scanner 222, for example by means of motor or motors M2 on shafts 258, 268 for the outer rolls running in suitable bearings 269 (Fig. 11).

As shown in Figs. 13 and 15, two bridges 271, 272, mounted on table frames 215 are arranged above the inner, curved table edges; these bridges support in suitable bearings 275 guide rolls 281—283, 285—287 and 291—293, 295—297 carrying belts 290. The inner guide rolls are concave corresponding to the inner table rolls, whereas the outer guide rolls may be straight. As shown in Fig. 13, the guide rolls may be covered with sponge rubber cushions 301, and the outer guide rolls are somewhat lifted to form a wedge-shaped gap for gripping the sheet material advancing on the feeding table, for example the table on the right-hand side of Fig. 10, towards the scanning window.

In Figs. 14 and 13, wires 191, 192 and 193, 194 of lamp L and photo tube T, respectively, are indicated which lead to a circuit, for example corresponding to one of those shown in Figs. 1 and 3. The measuring indicator G is preferably provided in front of the feeding station as indicated in Fig. 10, which also indicates protective covers for the conveyors, and a counter C.

In operating this modification, the sheets to be measured, as for example hides, are laid on the moving carrier belts of the feeding table 241 which convey them towards the scanning window above which they are securely gripped by companion belts 290. The corresponding belts of discharge table 242 convey the hides from the scanner, and they can be conveniently removed from this discharge table. Motors M1 and M2 running in synchronism (a gear link from a single power source may of course be provided for that purpose), the speeds of hide F and of scanner 222 are exactly correlated so that indicator G can be linearly calibrated.

During the periods when arm 222 moves over surface F, for example a hide, light from lamp L is excluded from photo tube T; at all other times, light from L or 226 will reach tube T and stop the indicator from moving. It will now be evident that the first-mentioned periods correspond to paths $p, q, \ldots z$ of Figs. 1 and 2 and that the integration will proceed as described with reference to these figures.

As above mentioned, it may become desirable to compensate for variations in scanning speed. An arrangement for accomplishing this purpose, even if the nature of the variations is unknown, will now be described with reference to Fig. 18. In this figure, 211 is, for example, the scanner shaft as shown in Fig. 13, 220 the scanner hub, 222 the scanning rod, and MI the means driving the scanning device at varying speed. The rotor of a generator 300 is in fixed speed relation connected to shaft 211, the potential developed by the generator varying proportionate to speed variations of the scanning device. This potential is supplied, if desirable, through suitable translating devices, to the voltage element 23 of the watt hour meter 20 whose function has been explained with reference to Fig. 3. Scanning speed changes accelerate or decelerate the generator and correspondingly increase or decrease, respectively, the voltage supplied to the indicator which will be correspondingly affected. Hence, this arrangement inherently compensates for variations in scanning speed.

Instead of providing an electrical integrating device, a mechanical integrator may be employed, especially if the desired measuring accuracy is not very high. Fig. 19 indicates an arrangement of this type. In that figure, 211 may again be a shaft carrying scanning device 220 with rod 222 and photo tube T. The potential supplied by the photo tube when illuminated is suitably amplified in relay device B. The output current of device B is used to operate a coupling device, for example magnetic clutch D adapted to connect shaft 211 to a counting device C. Coupling D will start counter C to run as soon as the scanning light flux intensity is changed upon the scanning path passing from area F to area S (Fig. 1) or vice versa, summating in this manner the scanning paths traversing the area to be measured, in the above described manner.

It will be evident that either the scanning paths traversing area F or those traversing area S may be summated and the sum translated to furnish the corresponding area; if a boundary of one of the two areas is known, as for example the rectangular outer shape of area S in Fig. 1, the other area can be obtained by algebraic addition. Also, known areas may be included in the area to be integrated. For example, referring to Fig. 5, both sheet 54 and the skin F may be dark; since the areas of sheets 54 and 58 are known, the skin area can again be obtained directly by suitably arranging the integrating device.

It should be understood that the present disclosure is for the purpose of illustration only and that this invention includes all modifications and equivalents which fall within the scope of the appended claims.

I claim:

1. In integrating apparatus wherein an article having an area to be measured is scanned by a light beam directed toward a photoelectric scanning means delivering impulses of electric energy of substantially constant amplitude while affected by a light translating property of said article, means for moving said area and said scanning means relatively to each other along scanning paths traversing said area condenser, means for electrically adding said electric energy impulses, and means for electrically indicating the instantaneous total mount of added energy and hence a sum of said scanning paths.

2. Measuring apparatus of the type described comprising a cylindrical at least partly transparent support for a sheet to be measured, a reflecting cover for said sheet fitting said support, scanning unit guiding means coaxial with said support, a scanning unit mounted on said guiding means including a light source, a photoelectric tube, and means for directing a light beam from said light source towards said support and back to said tube, and means for moving said unit on said guiding means in a helical path over said support from and returning to a starting point, whereby said beam traces paths traversing said sheet and said tube is affected by said beam proportionate to the lengths of said paths.

3. Apparatus of the type described comprising curved means for supporting a sheet to be measured, a lead screw journaled substantially concentrical with said supporting means, a scanning unit having a threaded hub portion engaging said screw, a tube journalled coaxially with said screw and having a slot engaging said hub portion, means for driving said screw and said tube at different speeds, means for disengaging said screw from said driving means, means for immobilizing said screw, and means actuated at one end of the travel of said unit to connect said screw to said driving means and at the other end of said travel to immobilize said screw, whereby said unit is guided back and forth in helical motion over said supporting means.

4. Apparatus according to claim 3 comprising means for automatically stopping said unit at one end of its travel and means for restarting it at will.

5. In integrating apparatus wherein an area to be measured is photoelectrically scanned by a light beam directed toward a photoelectric element placed to receive from a light source light flux as translated by said area, means for moving said beam relatively to said area, electron discharge means having an input circuit controlled by said element to deliver into its output circuit electric energy discharges of substantially constant amplitude, only so long as the flux received by said element is substantially on one side of a value determined by said area, condenser means in said output circuit for storing said electric energy, and electric metering means connected to said condenser means for indicating the amount of energy stored.

6. In integrating apparatus wherein an area to be measured is photoelectrically scanned by a light beam directed toward a photoelectric element placed to receive from a light source light flux as translated by said area, means for moving said beam relatively to said area in paths traversing said surface, electron discharge means with control electrode whose anode current is substantially constant with varying anode voltage for a given control electrode potential and having an input circuit containing said element and furnishing a substantially constant control electrode potential when the conductivity of said element falls below a certain value corresponding to a certain light flux value received by said element in accordance with said translation by said area, a condenser in the output circuit of said electron discharge means, and an electrostatic voltmeter connected to said condenser for summating the charges thereon and hence said paths.

ARTHUR G. B. METCALF.